US007927680B2

(12) United States Patent
Marshall

(10) Patent No.: US 7,927,680 B2
(45) Date of Patent: Apr. 19, 2011

(54) TEMPORARY FACIAL DECAL

(76) Inventor: Douglas Marshall, Tyler, TX (US)

( * ) Notice: Subject to any disclaimer, the term of this patent is extended or adjusted under 35 U.S.C. 154(b) by 338 days.

(21) Appl. No.: 11/938,698

(22) Filed: Nov. 12, 2007

(65) Prior Publication Data

US 2009/0120565 A1 May 14, 2009

(51) Int. Cl.
*B32B 9/00* (2006.01)

(52) U.S. Cl. ... 428/40.1; 428/195.1; 2/206; 156/244.16; 156/244.18

(58) Field of Classification Search ..... 2/206; 428/40.1, 428/195.1; 156/244.16, 244.18
See application file for complete search history.

(56) References Cited

U.S. PATENT DOCUMENTS 4,594,276 A 6/1986 Relyea
5,669,395 A 9/1997 Thompson
6,074,721 A 6/2000 Moore
6,161,554 A 12/2000 Dunlap-Harris
6,264,786 B1 7/2001 Cromett
6,977,106 B2 12/2005 Billings
2005/0281991 A1 12/2005 Funke
2007/0036928 A1 * 2/2007 Givens et al. ................ 428/40.1
2008/0053476 A1 * 3/2008 LaHood et al. ............... 132/320

FOREIGN PATENT DOCUMENTS

GB 2362576 11/2001
GB 2394443 4/2004
JP 11344946 12/1999
WO WO99/61234 12/1999

* cited by examiner

*Primary Examiner* — Bruce H. Hess
*Assistant Examiner* — Tamra L Amakwe
(74) *Attorney, Agent, or Firm* — Michael I. Kroll

(57) ABSTRACT

A temporary facial decal comprising a mask-like substrate having apertures for the eyes and mouth and having a nose opening taken from the group of slit and aperture with the body of the mask having a transferable image thereon covered by a removable protective sheet that is removed from the decal which is then placed on the user's face using the provided apertures for alignment whereupon an agent, preferably water, is used to transfer the image onto the user's face.

8 Claims, 7 Drawing Sheets

TEMPORARY FACIAL DECAL

BACKGROUND OF THE INVENTION

1. Field of the Invention

The present invention relates generally to tattoos and, more specifically, to temporary facial decals comprising a mask-like substrate having apertures for the eyes and mouth and having a slit for the nose, optionally providing an aperture for the nose, with the body of the mask having a transferable image thereon covered by a removable protective sheet. Tailoring of the mask size can be performed at the user's discretion.

The protective member is removed from the decal which is placed on the user's face using the provided apertures for alignment whereupon an agent, preferably water, is used to transfer the image onto the user's face.

When desired the user can remove the decal using soap and water, alcohol or baby oil in combination with a hand towel. The decal can also be removed from dry skin using transparent household tape or the like.

The present invention also provides for manufacturing the facial mask in one size and can be trimmed to fit, or provided in small, medium, large and extra large sizes. The decal may also include materials to create a glow-in-the-dark effect typical of Halloween costumes and/or camouflage decals for hunting and the like. In all varying design elements, the decal comprises cutout areas and is applied with cutout area s placed around eyes, nose and mouth.

2. Description of the Prior Art

There are other temporary tattoos designed for body art. Typical of these is U.S. Pat. No. 4,594,276 issued to Relyea on Jun. 10, 1986.

Another patent was issued to Thompson on Sep. 23, 1997 as U.S. Pat. No. 5,669,395. Yet another U.S. Pat. No. 6,074,721 was issued to Moore, et al on Jun. 13, 2000 and still yet another was issued on Dec. 19, 2000 to Dunlap-Harris as U.S. Pat. No. 6,161,554.

Another patent was issued to Cromett on Jul. 24, 2001 as U.S. Pat. No. 6,264,786. Yet another U.S. Pat. No. 6,977,106 was issued to Billings on Dec. 20, 2005. Another was published to Funke et al. on Dec. 22, 2005 as U.S. Patent Application No. 2005/0281991 and still yet another was published on Feb. 15, 2007 to Givens as U.S. Patent Application No. 2007/0036928.

Another application was published to Cromett on Dec. 2, 1999 as International Patent Application No. WO 99/61234. Yet another Japan Patent No. JP11344946 was issued to Kiyamura on Dec. 14, 1999. Another was issued to Millward on May 24, 2000 as U.K. Patent Application No. GB 2362576 and still yet another was issued on Apr. 28, 2004 to Woodhouse as U.K. Patent Application No. GB 2394443.

U.S. Pat. No. 4,594,276

Inventor: Keith E. Relyea

Issued: Jun. 10, 1986

This invention relates to body tattoos, and particularly adhesively applied body tattoos. In particular, the present invention relates to tattoos comprising a printed image on a translucent surface of a porous, non-woven, compacted tissue substrate with an adhesive on the back-side of the substrate. The translucent qualities of the substrate enhance the visual effect of the printed image.

U.S. Pat. No. 5,669,395

Inventor: Yvonne Thompson

Issued: Sep. 23, 1997

Disposable protective wear for persons who sun tan, providing a shield for sensitive parts of the body against exposure, while allowing for maximum coloring of the body and sanitary conditions within tanning salons. The disposable protective wear consists of separate articles of face cover, adjustable lower cover and breast covers, all with adhesive means to hold the articles in place on the wearer.

U.S. Pat. No. 6,074,721

Inventor: George Moore

Issued: Jun. 13, 2000

A temporary decal comprising a porous paper base coated with a water-soluble slip layer (e.g., dextrin gum) on which offset printing inks are directly imprinted using a high speed lithographic press. The inks are printed in a designated area only, in a desired image. A clear spot coating, preferably of an aqueous material, is then printed over the image area only. A contact adhesive is then spot printed over the image area of each decal, preferably using a silk screen press. A removable cover sheet, such as a silicone-coated sheet, is placed over the contact adhesive of each printed sheet of decals to keep the sheets from sticking together. The spot coating acts as a protective layer that keeps the contact adhesive from migrating to the surface of the decal after the finished temporary tattoo is applied to the skin. Without the spot coating, the surface of the decal would become sticky to the touch and the decal would come off faster because of friction with the surrounding environment.

U.S. Pat. No. 6,161,554

Inventor: Angela L. Dunlap-Harris

Issued: Dec. 19, 2000

Aesthetically attractive, moisture activated, removable tattoo eyebrows for the cosmetic enhancement of a human face where eyebrows are usually present. The removable tattoo eyebrows are temporary, simulated eyebrows composed of a moisture activated transferable colorant material, preferably located on a sheet of plastic, cloth or paper. The removable tattoo eyebrows come in various designs, sizes, shapes and/or colors. The removable tattoo eyebrows can be quickly and easily transferred onto a human face, by placing the sheet containing the tattoo up against the eyebrow region of the face, and applying moisture from a damp cloth or sponge.

U.S. Pat. No. 6,264,786

Inventor: John Cromett

Issued: Jul. 24, 2001

A temporary tattoo formed from an image-bearing laminate for attachment to human skin. The laminate includes a printable release coating on a backing sheet and an image printed with ink on the printable release coating. A film that is impenetrable to the ink is attached to the image, and includes adhesive on an exposed face of the film. The coating, image and film may be attached to human skin by pressing the combination of the coating, image, film and adhesive on skin. A method of creating the temporary tattoo includes the steps of providing a coated release sheet, printing an image on the coated release sheet, providing a film, covering the image with the film so that the image is located between the film and the coating of the release sheet to create a film/image/coating laminate, attaching the film/image/coating laminate to skin, and removing a backing sheet of the release sheet from the film/image/coating laminate.

U.S. Pat. No. 6,977,106

Inventor: Scott Billings

Issued: Dec. 20, 2005

A decal body art method and means produces a simple adhesive bandage which has a substrate carrying a compound layer consisting of a pressure sensitive adhesive in which is dissolved an artificial tanning agent. The bandage, or its compound layer, is shaped or formed to depict a selected image. The compound layer is covered with a removable release liner. In use, the release liner is removed and discarded. The compound layer is directly adhered to the skin, whereupon a self-tanning image of a rich tan color is formed on the skin of the user.

U.S. Patent Application Number 2005/0281991

Inventor: Barbara Funke

Published: Dec. 22, 2005

A temporary tattoo for placement on an individual's skin includes a first portion and a second portion. The first portion and the second portion have different images thereon. When the first portion and the second portion are combined they form a complete image.

U.S. Patent Application Number 2007/0036928

Inventor: James K. Givens

Published: Feb. 15, 2007

The present invention is moisture activated removable facial camouflage tattoo carrier sheet for disguising a human face. The tattoo carrier sheet comprises a water permeable transfer sheet, at least one temporary and removable moisture activated facial camouflage tattoo is disposed on the water permeable transfer sheet. A protective release sheet is removably disposed on the water permeable transfer sheet over the facial camouflage tattoo as temporary protective covering for the facial camouflage tattoo.

International Patent Application Number WO 99/61234

Inventor: John Cromett

Published: Dec. 2, 1999

A temporary tattoo (10) formed from an image-bearing laminate (12/16) for attachment to human skin. The laminate (12/16) includes a printable release coating (24/26) on a backing sheet (22) and an image (14) printed with ink on the printable release coating (24/26). A film (28) that is impenetrable to the ink is attached to the image (14), and includes adhesive (32) on an exposed face of the film (28). The coating (26), image (14) and film (28) may be attached to human skin by pressing the combination of the coating (26), image (14), film (28) and adhesive (32) on skin (200). A method of creating the temporary tattoo (10) includes the steps of providing a coated release sheet (12), printing an image (14) on the coated release sheet (12), providing a film (28), covering the image (14) with the film (28) so that the image (14) is located between the film (28) and the coating (26) of the release sheet (12) to create a film/image/coating laminate (12/16), attaching the film/image/coating laminate (12/16) to skin (200), and removing a backing sheet (22) of the release sheet (12) from the film/image/coating laminate (12/16).

Japan Patent Number JP 11344946

Inventor: Kitamura Toru

Issued: Dec. 14, 1999

PROBLEM TO BE SOLVED: To provide a method for inserting advertisement not to be peeled off, colors of which are not faded and thinned out even when it is inserted on a human face for a long time. SOLUTION: First, a tattoo seal 1 with printed name, trademark and product name of a company desired to be advertised and to appear as a tattoo when it is stuck to a body is prepared. Next, the tattoo seal 1 is stuck to the human face 2 desired to be used as a medium of the advertisement.

U.K. Patent Application Number GB 2362576

Inventor: Helen Millward

Published: Nov. 28, 2001

A natural alternative to a tattoo consists of neoprene, or any other suitable UV opaque material with a peel off backing that exposes the hypoallergenic adhesive.

U.K. Patent Application Number GB 2394443

Inventor: James Frederick Woodhouse et al

Published: Apr. 28, 2004

The edible transfer tattoo of the invention comprises a starch based substrate having a design printed thereon using edible inks. In the method of manufacture a plurality of tattoo designs are applied to a sheet of the starch based substrate by an off-set printing process or by a silk screen process. Thereafter, the sheet is subjected to cutting and snagging operation to facilitate the ready removal of the edible transfers from the sheet. In one composition provided by the invention, the starch based substrate is comprised of gum acacia, maize starch, micro-crystalline cellulose, xanthan gum, titanium dioxide, modified starch, potassium sorbate, water, sorbitol, glycerine polysorbate 60, vanilla flavoring, lecithin and rapeseed oil. The tattoos may be used for personal use, especially by children, for application to the skin without any deleterious side affects. Further use of the edible tattoos includes their application to comestible products such as iced biscuits.

While these temporary tattoos may be suitable for the purposes for which they were designed, they would not be as suitable for the purposes of the present invention, as hereinafter described.

SUMMARY OF THE PRESENT INVENTION

A primary object of the present invention is to provide a temporary facial decal.

Another object of the present invention is to provide a temporary facial decal having a substrate for applying a decorative image thereon.

Yet another object of the present invention is to provide a temporary facial decal wherein said image is transferable through application of an agent, preferably water to said substrate.

Still yet another object of the present invention is to provide a temporary facial decal wherein said mask-like substrate has apertures for eyes and mouth and nose opening taken from slit and aperture.

Another object of the present invention is to provide a temporary facial decal wherein said mask-like apertures serve as alignment guides for applying the temporary decal.

Yet another object of the present invention is to provide a temporary facial decal wherein said nose slit forms means for applying the decal to the sides of the nose when having decal thereon.

Additional objects of the present invention will appear as the description proceeds.

The present invention overcomes the shortcomings of the prior art by providing a temporary facial decal comprising a mask-like substrate having apertures for the eyes and mouth and having a nose opening taken from the group of slit and aperture with the body of the mask having a transferable image thereon covered by a removable protective sheet that is removed from the decal which is then placed on the user's face using the provided apertures for alignment whereupon an agent, preferably water, is used to transfer the image onto the user's face. When desired the user can remove the decal using alcohol or baby oil.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
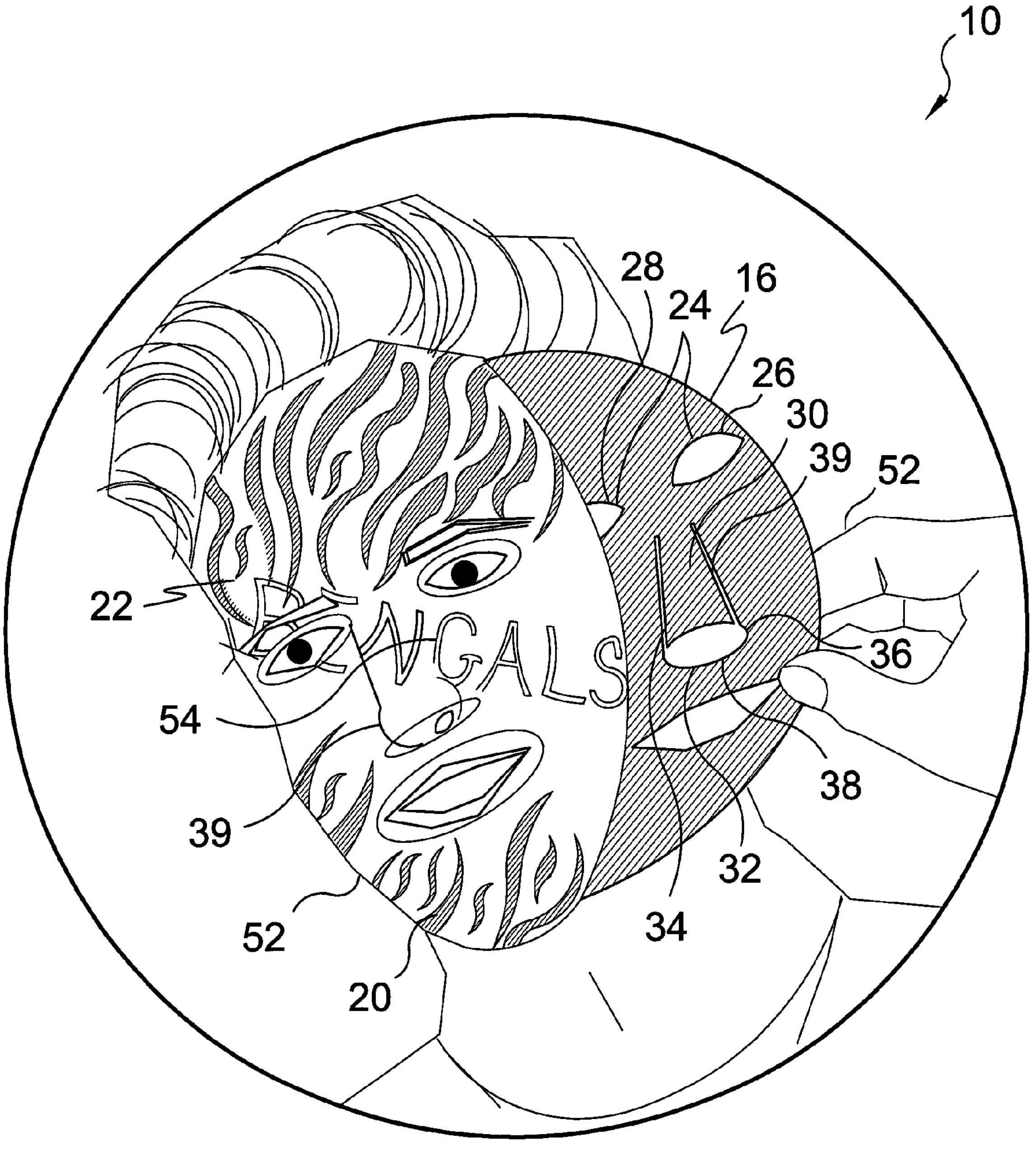
FIG. 1 is an illustrative view of the temporary facial tattoo of the present invention in use.

Turning now descriptively to the drawings, in which similar reference characters denote similar elements throughout the several views, the figures illustrate the Temporary Facial Tattoo of the present invention. With regard to the reference numerals used, the following numbering is used throughout the various drawing figures.

10 Temporary Facial Tattoo of the present invention
12 decal assembly
14 protective cover sheet of 12
16 permeable substrate mask of 12
18 decal backing of 12
20 facial decal
22 transferable color material
24 eye aperture
26 left eye aperture
28 right eye aperture
30 nose insert
32 slitted nose insert
34 left side slit of 32
36 right side slit of 32
38 bottom slit of 32
39 nose segment
40 nose aperture
41 nose overlay
42 mouth aperture
44 front surface of 14
46 rear surface of 14
48 front surface of 16
50 rear surface of 16
52 user
53 nose of 52
54 team name
56 water
58 applicator
60 front surface of 18

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the temporary facial tattoo of the present invention 10 in use. The present invention is a temporary facial tattoo 10 comprising a mask-like substrate 16 having apertures for the eyes 24 (right 28 and left 26) and mouth 32 with a nose insert 20. Shown is the user 52 peeling of the permeable substrate mask 16 to reveal the transferable color material 22 defining the facial decal 20 including the name 54, design and colors of the users 52 sports team. Shown is the slitted nose insert 32 comprising a left side slit 34, a right side slit 36 and a bottom slit 38 a medial nose segment 39 to adjust to the contours and cover the nose 53 of the user 52 to apply the decal 20 thereto.

Figure 2:
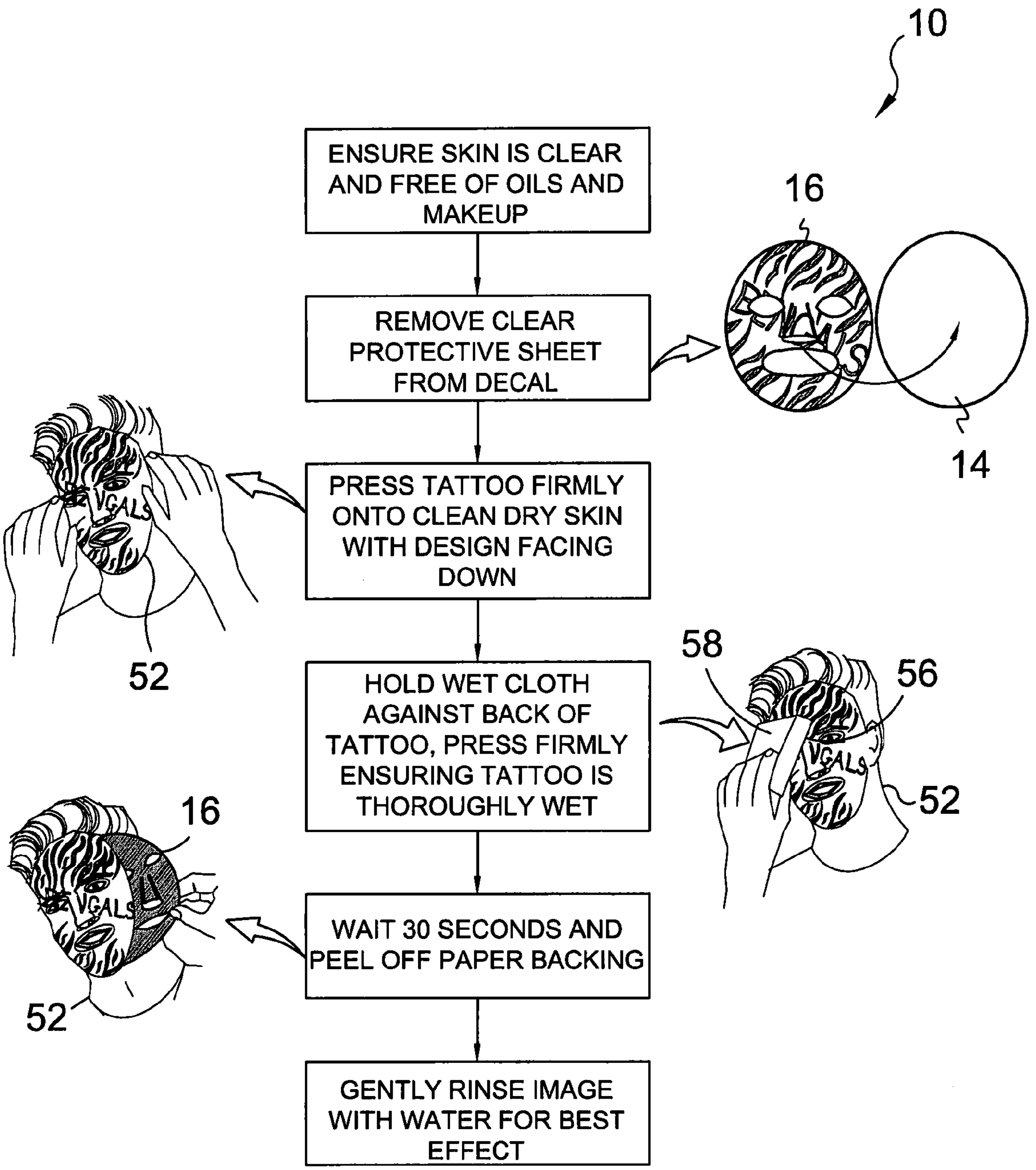
FIG. 2 is a stepwise view of the application of the temporary facial decal to a user's face.

FIG. 2 is a stepwise view of the application of the present invention 10 to a user's 52 face. The decal of the present invention 10 can be trimmed as desired by the user 52 prior to removing the protective cover sheet 14 whereupon the substrate mask 16 is applied to the user's face with cutout areas placed around eyes and mouth with the nose flap positioned on their respective sides. When the permeable substrate 16 is firmly placed, water 56 is applied to an applicator 58 then removed leaving the substrate 16 fixedly attached to the user's 52 face.

Figure 3:
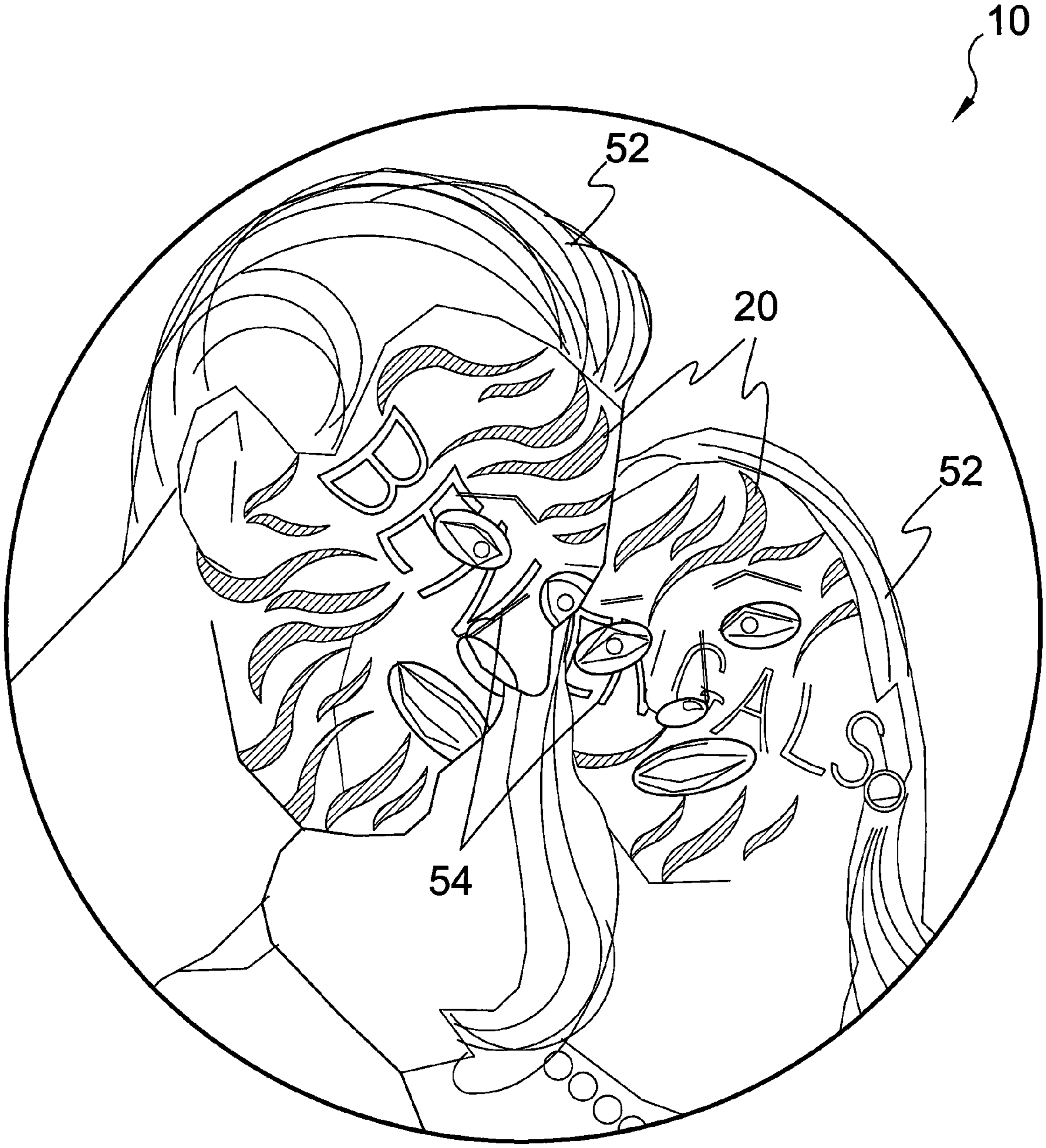
FIG. 3 is an illustrative view of the present invention in use.

FIG. 3 is an illustrative view of the present invention 10 in use. Shown is the decal of the present invention 10 applied to the faces of two sports fans 52. The washable, removable decal 20 depicting a sports fan's favorite team logo and name 54 is applied to a user's 52 face and worn at sports events. The decal 20 is provided in one size and can be trimmed to fit, or provided in small, medium, large and extra large sizes. The decal 20 may also include materials to create a glow-in-the-dark effect typical of Halloween costumes and/or camouflage decals for hunting and the like. In all varying design elements, the decal 20 comprises cutout areas and is applied with cutout areas placed around eyes, nose and mouth.

Figure 4:
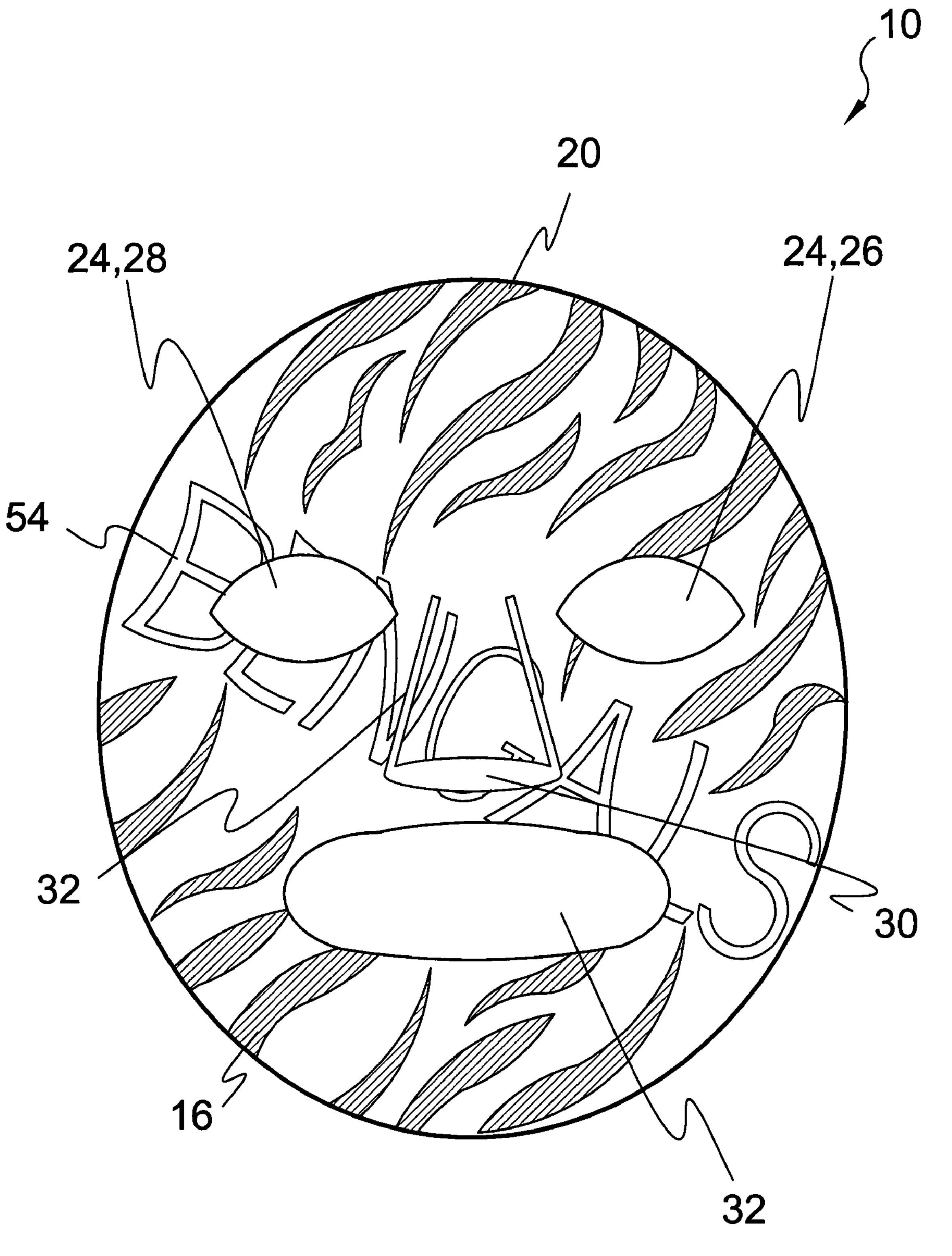
FIG. 4 is a front view of the facial decal of the present invention.

FIG. 4 is a front view of the facial decal of the present invention 10. The present invention 10 has a permeable substrate mask 16 having apertures for the eyes 24 (right 28 and left 26) and mouth 32 with a nose insert 20 having a transferable image decal 20 (shown here as a team design and name 54) composed of a transferable color material 22 covered by a protective member that is removed prior to applying to the user's face using the provided apertures for the right eye for alignment whereupon an agent, preferably water, is used to transfer the image onto the user's face. When desired the user can remove the decal 20 using soap and water, alcohol or baby oil in combination with a hand towel. The decal 20 can also be removed from dry skin using transparent household tape. The mask 16 can be tailored by the user at their discretion. The present invention also provides for manufacturing the facial mask 16 in incremental sizes including small, medium, large and extra large.

Figure 5:
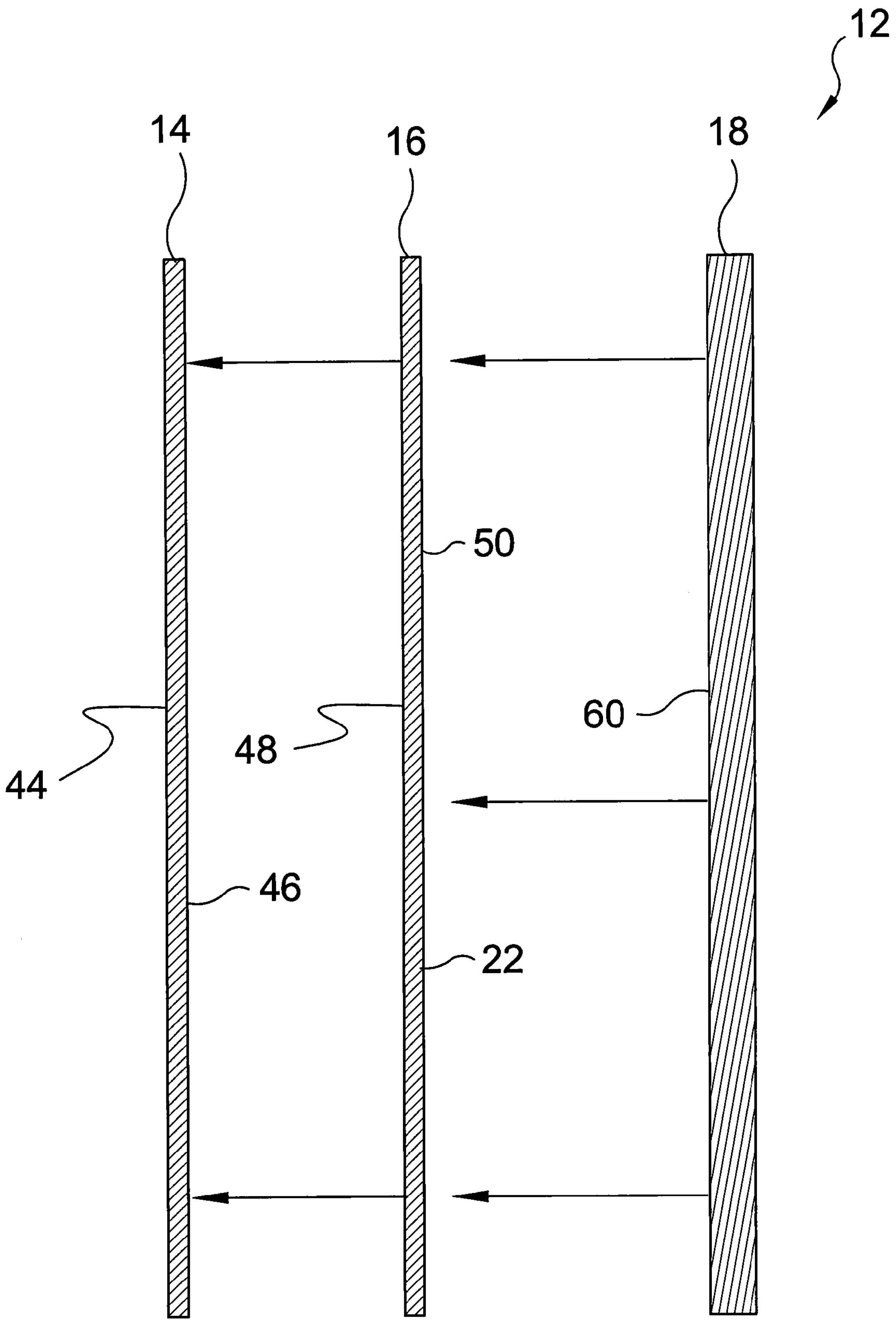
FIG. 5 is a sectional view of the facial decal mask.

FIG. 5 is a sectional view of the stratified decal assembly 12. The decal assembly 12 comprises a transparent protective cover 14 having a front surface 44 and a rear surface 46 that is releasably engaged with the front surface 48 of the substrate mask 16. The rear surface 50 of the substrate mask 16 has the transferable color material 22 of the design disposed thereon and is engaged with the front surface 60 of the decal backing 18.

Figure 6:
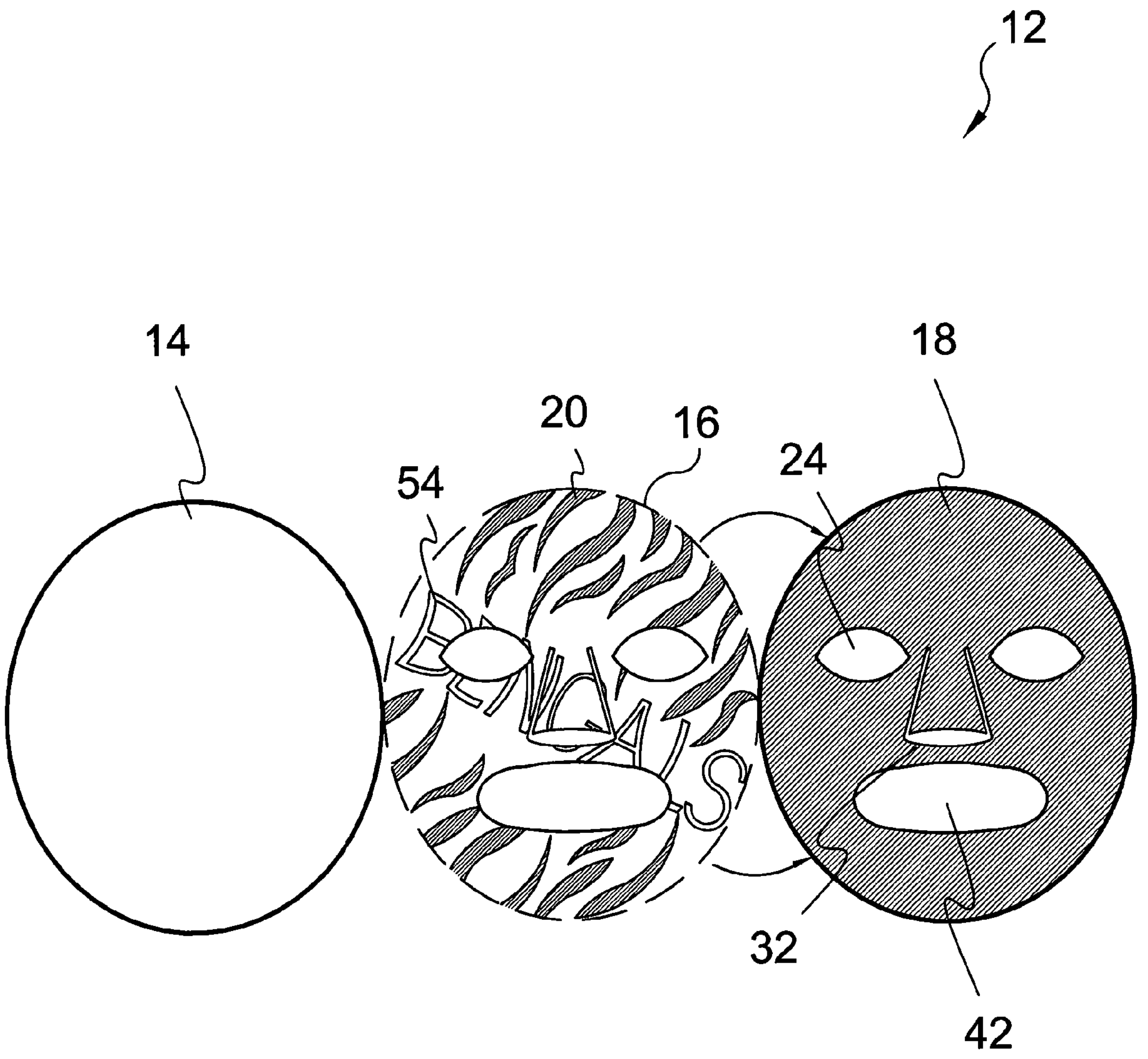
FIG. 6 is an exploded view of the temporary facial tattoo of the present invention.

FIG. 6 is an exploded view of the temporary facial tattoo decal assembly 12. Illustrated is the temporary facial tattoo comprising a mask-like substrate 16 having apertures for the eyes 24 and mouth 42 and a slit for the nose 32 with the body of the mask 16 having a transferable decal 20 with a team design and name 54 thereon covered by a protective member 14. The decal 20 is transferable to a user's face using the provided apertures for alignment whereupon an agent, preferably water, is used to transfer the image onto the user's face.

Figure 7:
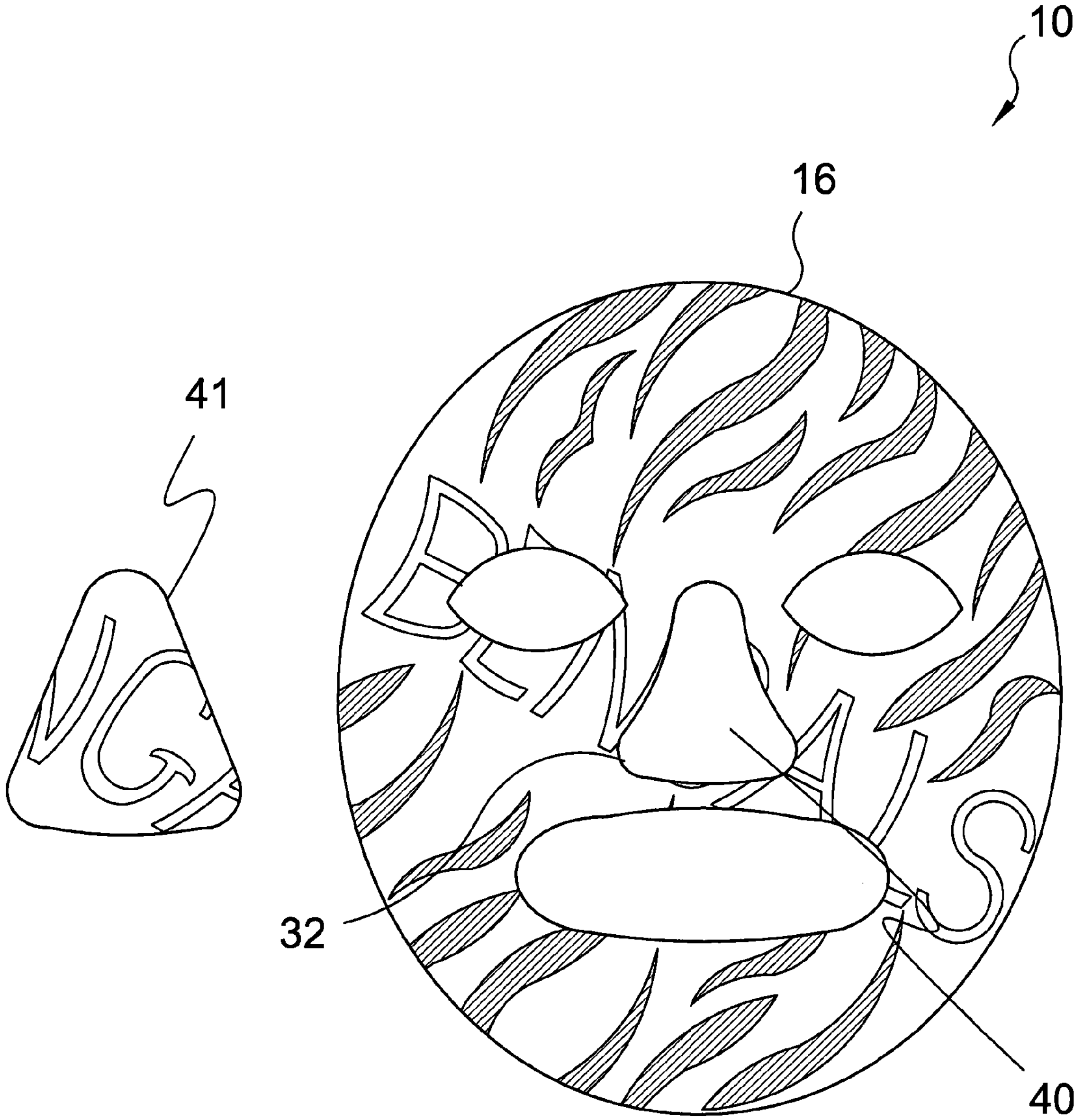
FIG. 7 is an exploded view of the temporary facial tattoo having an additional element.

FIG. 7 is an exploded view of the temporary facial tattoo of the present invention 10 having an additional element. Illustrated is the temporary facial tattoo providing an additional element comprising a mask-like substrate 16 wherein the nose insert 32 is a nose aperture 40 through which the nose of the user is inserted and then covered with a separate nose overlay 41 to transfer a corresponding image.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A temporary facial tattoo for application to a users face, the tattoo comprising:

a) a substrate layer formed of a substantially planar sheet of water permeable material, b) a decorative ink layer disposed on one side of said substrate layer;

c) an adhesive layer disposed on a side of said decorative ink layer opposite said substrate layer;

d) a protective covering layer disposed on a side of said adhesive layer opposite said decorative ink layer, said protective covering layer being transparent and removable from said adhesive layer;

e) four apertures extending through each said layer, two of said apertures forming eye holes, one of said apertures forming a mouth hole, and one of said apertures forming a nose hole;

f) said nose hole having two spaced slits extending away from said nose hole forming a flexible nose flap, said slits being spaced apart from each other and extending through each of said layer; and g) wherein the protective covering layer is removed prior to application to expose the adhesive layer, the tattoo is secured to the face of the user by the adhesive layer, the substrate layer is wetted to release the substrate layer from the decorative ink layer, and the substrate layer is peeled from said decorative ink layer exposing the decorative ink layer on the face of the user.

2. The temporary facial tattoo recited in claim 1, wherein said facial tattoo is cut with scissors to provide custom sizing and shaping for the face of the user.

3. The temporary facial tattoo recited in claim 1, wherein said tattoo is available in a plurality of sizes.

4. A method of applying a temporary facial tattoo to the face of a user, the method comprising:

providing a temporary facial tattoo, the tattoo comprising:

a) a substrate layer formed of a substantially planar sheet of water permeable material, b) a decorative ink layer disposed on one side of said substrate layer;

c) an adhesive layer disposed on a side of said decorative ink layer opposite said substrate layer;

d) a protective covering layer disposed on a side of said adhesive layer opposite said decorative ink layer, said protective covering layer being transparent and removable from said adhesive layer; and e) four apertures extending through each said layer, two of said apertures forming eye holes, one of said apertures forming a mouth hole, and one of said apertures forming a nose hole;

f) said nose hole having two spaced slits extending away from said nose hole forming a flexible nose flap, said slits being spaced apart from each other and extending through each of said layer;

removing the protective covering layer to expose the adhesive layer;

placing the tattoo with the adhesive layer against the face of the user;

pressing the tattoo against the face of the user;

wetting the substrate layer with water to release the ink layer from the substrate layer; and removing the substrate layer from the ink layer exposing the ink layer on the face of the user.

5. The method of applying a temporary facial tattoo recited in claim 4, where the face of the user is washed and dried prior to application of the tattoo.

6. The method of applying a temporary facial tattoo recited in claim 4, wherein said tattoo is removed from the users face with a cleanser taken from the group consisting of soap, water, baby oil, and transparent tape.

7. The method of applying a temporary facial tattoo recited in claim 4, wherein the user aligns said apertures with corresponding facial areas to ensure accurate placement of the tattoo.

8. The method of applying a temporary facial tattoo recited in claim 4, wherein an applicator infused with water is used to wet the substrate layer.

* * * * *